Sept. 7, 1954  C. USCHMANN  2,688,393
MATERIAL DISPENSER
Filed June 24, 1952  5 Sheets-Sheet 1
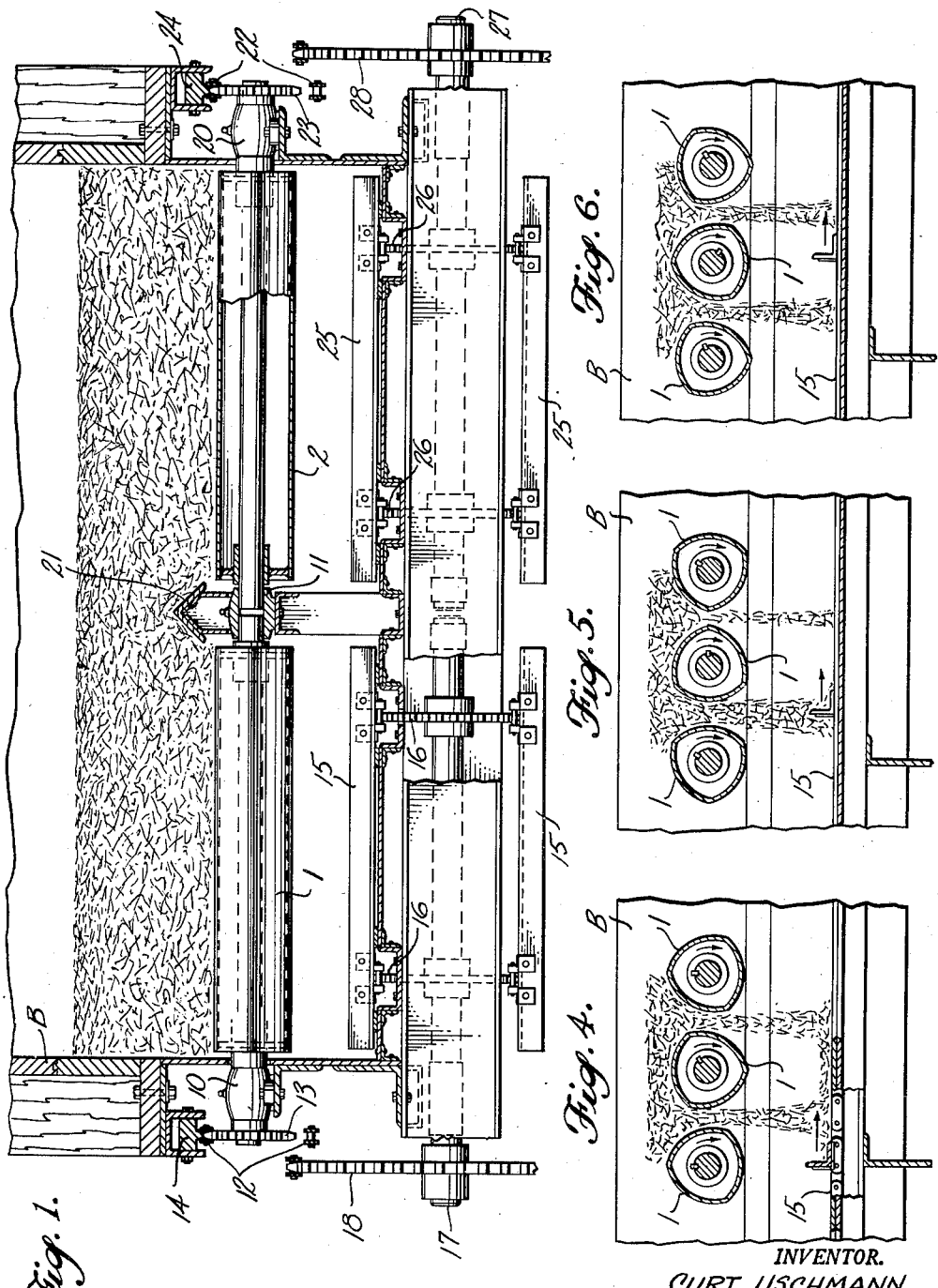
INVENTOR.
CURT USCHMANN
BY
ATTORNEYS

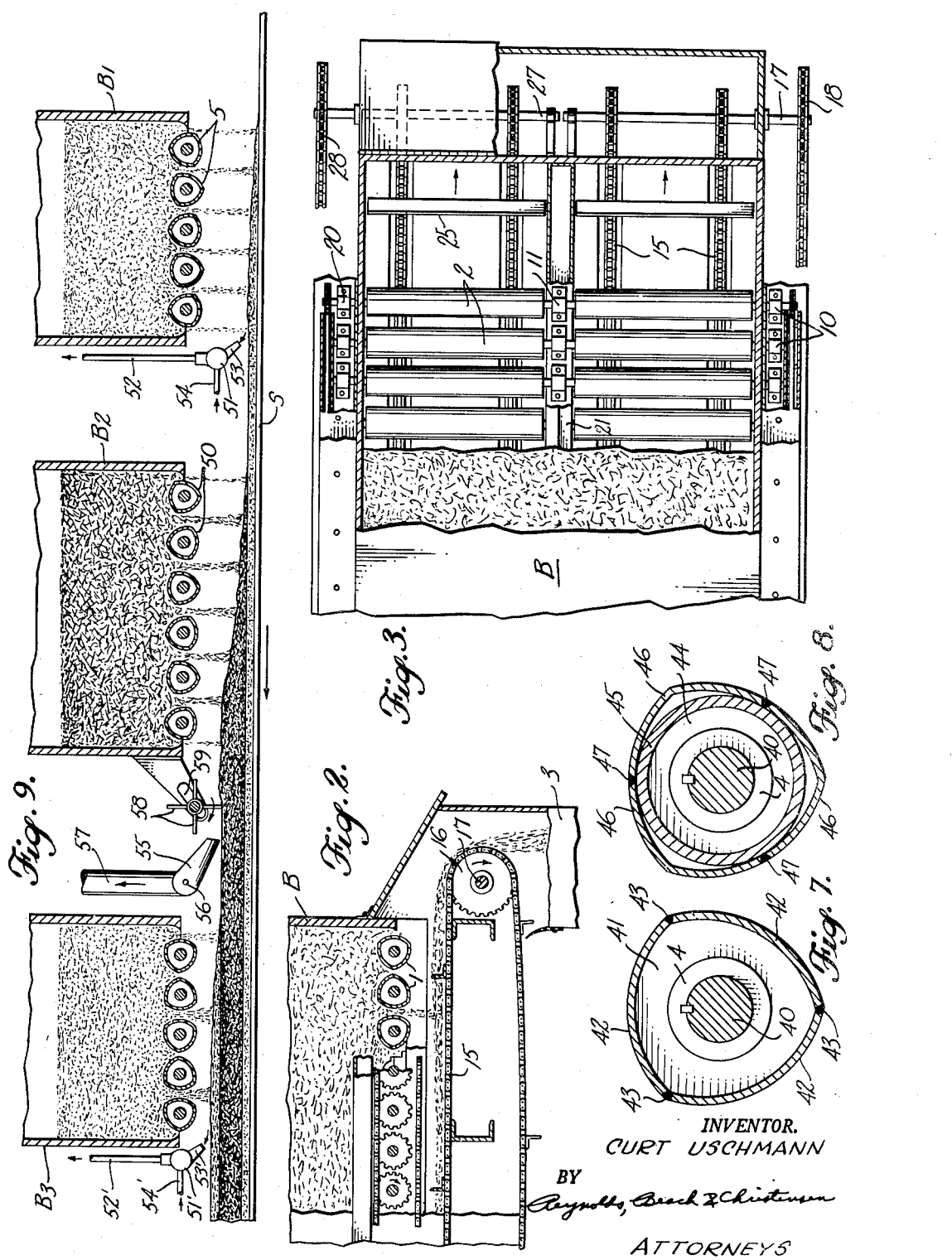

Sept. 7, 1954     C. USCHMANN     2,688,393
MATERIAL DISPENSER
Filed June 24, 1952     5 Sheets-Sheet 3
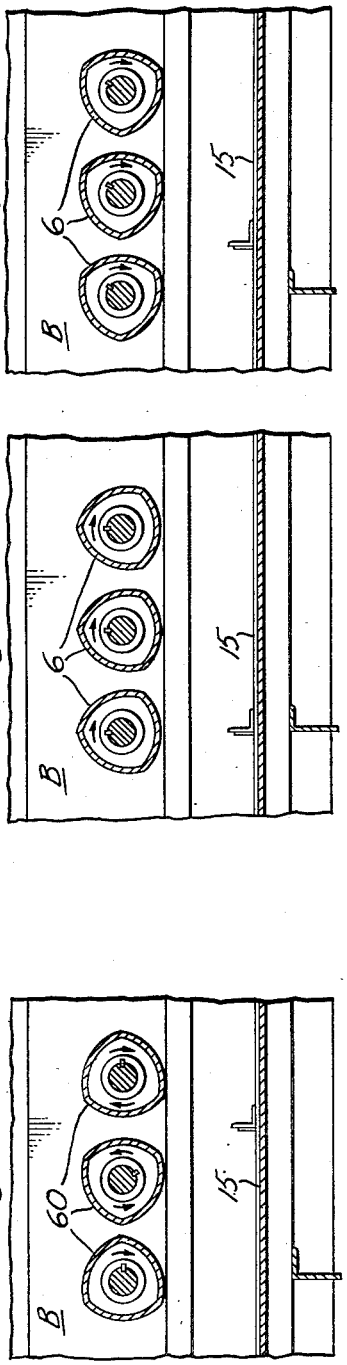
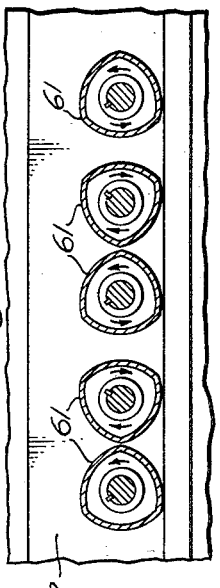
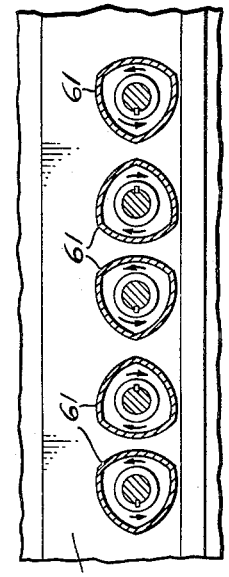
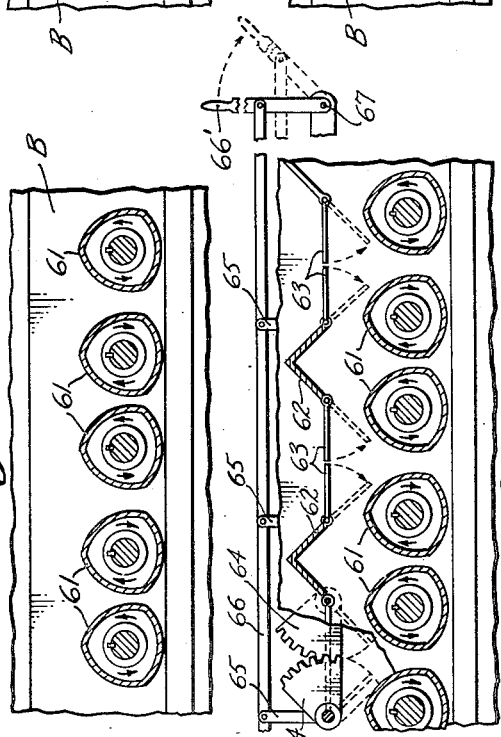
INVENTOR.
CURT USCHMANN
BY
Reynolds, Beach & Christensen
ATTORNEYS

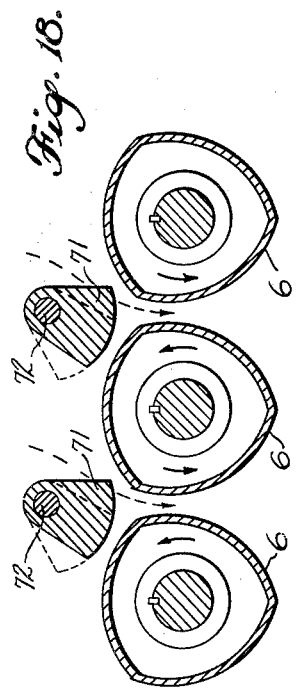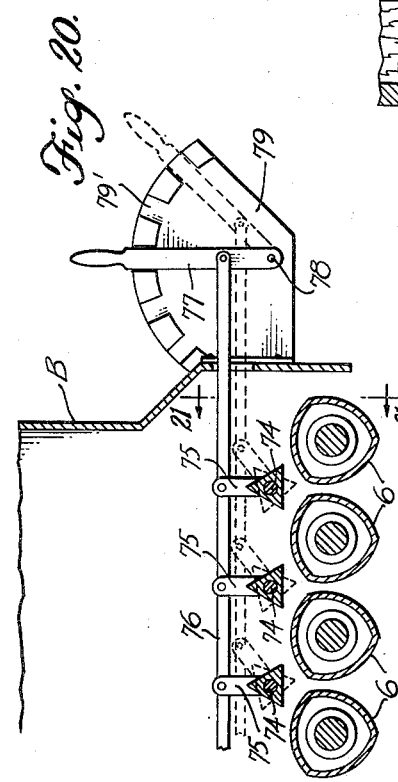

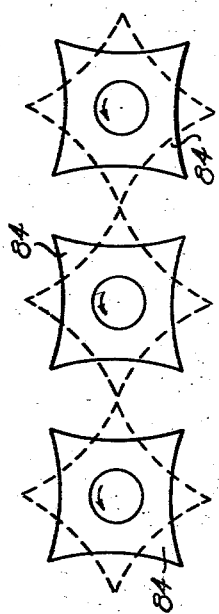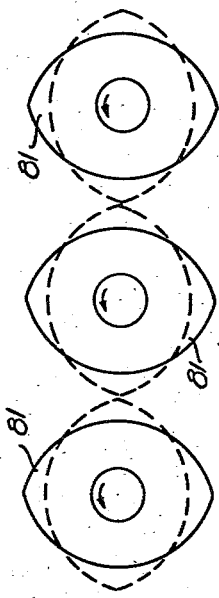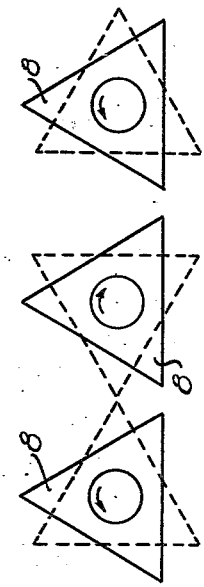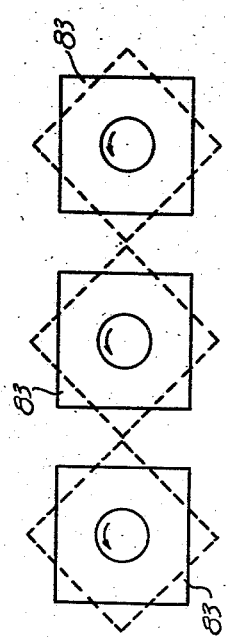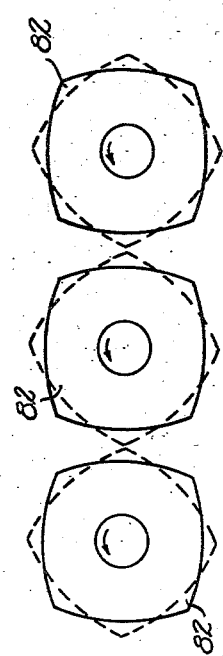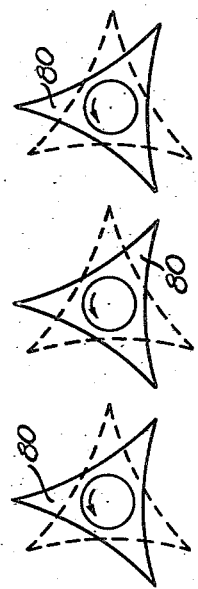

Patented Sept. 7, 1954

2,688,393

UNITED STATES PATENT OFFICE 2,688,393

MATERIAL DISPENSER

Curt Uschmann, Lebanon, Oreg., assignor to Cascades Plywood Corporation, Portland, Oreg., a corporation of Delaware Application June 24, 1952, Serial No. 295,309

21 Claims. (Cl. 198—56)

The dispenser of this invention will deliver at a predetermined rate materials of various types, whether of shredded, fibrous, granular, or powdery character, consistently and uniformly. Such dispensing is uniform both in quantity and in distribution substantially independent of the character of the supply source as long as such source is adequate. More specifically, such dispenser is capable of sifting particles of material from the bottom of a large storage bin, and the quantity and distribution of material dispensed will be substantially independent of the depth of material in the storage bin and the uniformity of such depth.

Especially where material in small particles is to be dispensed from a bin of such material it is desirable to prevent bridging of the material between the sides of the storage bin which would result in cavities being formed beneath such bridging material. Not only will the present dispenser discharge the material uniformly, but it will prevent such bridging within the storage bin.

Furthermore, the dispensing mechanism can easily be controlled, especially by changing the speed of the metering elements, or designed to dispense a material of given type at any desired rate within wide limits. In addition, the dispenser can be designed particularly for dispensing fine material, or to handle coarse material.

The dispenser includes primarily a row of parallel, adjacent, non-meshing rolls of non-circular cross section, and preferably angular, which are rotated continuously in one direction. The preferred form of roll has convex sides and in particular is of equilateral, triangular cross section. Such rolls are placed quite close together, the spacing of their axes where the rolls are of uniform size being between two and three times the greatest radius of a roll. In fact, usually such spacing will not exceed two and one-half times the length of the greatest radius of a roll.

These rolls may form the complete bottom of a storage bin or any substantial portion of it, and the rolls are rotated to agitate the material resting on them which will cause it to be sifted between adjacent rolls. Many variables may be altered or values of them selected to give the desired dispensing rate.

Various modifications of the dispenser are illustrated in the drawings, and possible variations of them are discussed in the following detailed description, but it will be evident that other alterations in structure, arrangement and operation following the principles of the present invention are possible.

Figure 1 is a vertical sectional view through the lower portion of a storage bin equipped with the sifting dispenser, and Figure 2 is a vertical sectional view taken through the lower portion of such a bin in a plane perpendicular to the sectional plane of Figure 1. Figure 3 is a plan view of one end of such storage bin, parts being broken away to reveal the dispenser structure.

Figures 4, 5 and 6 are fragmentary vertical sectional views through a portion of the dispensing mechanism showing the rolls in different rotative positions assumed during operation.

Figure 7 is a transverse sectional view through a roll of one type of construction, and Figure 8 is a similar view of a roll having the same shape but of different construction.

Figure 9 is a somewhat diagrammatic vertical sectional view through an assembly of dispensers utilized in combination to perform a particular type of stage dispensing operation.

Figure 10 is a diagrammatic vertical section through a fragmentary portion of a dispenser like that shown in Figures 4, 5 and 6, in which the rolls are rotated oppositely.

Figures 11 and 12 are vertical sectional views through a fragmentary portion of a dispenser similar to that shown in Figures 4, 5 and 6, but with the rolls oriented differently in relation to each other, showing the rolls in two phases of a cycle.

Figures 13, 14 and 15 are vertical sectional views through a portion of a dispenser in which the rolls are spaced unequally and illustrating the rolls in different relationships assumed during an operating cycle.

Figure 16 is a vertical sectional view through dispensing mechanism corresponding to Figures 13, 14 and 15, but incorporating additional regulating apparatus.

Figure 17 is a fragmentary, diagrammatic vertical sectional view through dispensing mechanism incorporating a type of control mechanism different from that shown in Figure 16. Figure 18 is similar to Figure 17 showing another type of regulating mechanism cooperating with rolls. Figure 19 is still another similar view incorporating a further form of regulating mechanism.

Figure 20 is a somewhat diagrammatic vertical sectional view through an end portion of a storage bin and dispensing mechanism showing an alternative combination of rolls and control mechanism. Figure 21 is a vertical sectional view through the bin and dispensing mechanism of Figure 20, taken on line 21—21 of that figure.

Figure 22 is a diagrammatic illustration of a dispensing roll arrangement like that shown in Figure 10, in which the rolls of equilateral triangular cross section have sides which are plane instead of convex. Figure 23 shows diagrammatically a roll arrangement similar to that illustrated in Figures 11 and 12, in which the rolls of equilateral triangular cross section have concave sides.

Figure 24 is a diagrammatic representation of rolls similar to that shown in Figures 11 and 12, in which the rolls have two convex sides, being of lenticular cross section.

Figures 25, 26 and 27 show diagrammatically roll arrangements similar to those of Figures 23 and 24, except that the rolls are of symmetrical, equilateral, quadrilateral cross section, the sides of the rolls in Figure 25 being convex, the sides of the rolls in Figure 26 being plane, and the sides of the rolls in Figure 27 being concave.

In general, the problem of dispensing material from a large storage bin, such as shown in Figures 1, 2 and 9, is to remove the material from all portions of the bin so that it will not tend to accumulate excessively in one part of the bin, and, second, to regulate the quantity of material dispensed from the bin so that a uniform quantity will be delivered irrespective of the total quantity of material stored in the bin or its depth. Associated with the problem of avoiding accumulations of material in the bin is that of preventing bridging of the material, which is particularly prevalent if the material is of coarse and rough character, such as sawdust or chips, or is of fibrous or shredded character. The present dispenser provides a satisfactory solution for these problems by discharging material through all, or at least a major portion, of the bottom of the storage bin and keeping the mass of material within the bin agitated to prevent bridging, while at the same time controlling the dispensing action so that a relatively small amount of material is delivered, and sifting such material so that its density is virtually the same whatever may be the depth of material stored in the bin.

In Figures 1 and 2 the bin B is provided with two sets of rolls 1, each set including rolls of a length to span half the width of the bin. Each set incorporates a row of parallel rolls all of the same size and shape. With such an arrangement either or both of the sets of rolls may be driven so that material can be dispensed from one side or the other of the bin, or from both sides at once. Alternatively, or as a further variation, each set of rolls may be divided into groups of rolls, each group being independently driven. Thus material may be dispensed from any one or more of several sections of bin bottom to obtain any desired quantity of feed within wide limits, and to withdraw material from one or more portions of the bin in preference to others.

The preferred shape of roll used in the dispenser is of convex, equilateral triangular shape in cross section. That is, the roll has three equally spaced angles, each forming the junction of two convex sides and the three sides being of equal length and similarly curved.

Dispensers utilizing rolls of such shape are shown in Figures 1 to 21, inclusive, but rolls of other shape, either triangular, bilateral or quadrilateral, as illustrated in Figures 22 to 26, inclusive, may be used. The general character of the dispensing mechanism and its operation utilizing convex equilateral triangular rolls will be described, but it should be kept in mind that the same general type of construction may be employed incorporating such other rolls and the resulting operation will be similar.

In Figure 2 rolls are shown in the same relationship as in the enlarged fragmentary illustration of Figure 5, and the operation of such rolls to dispense material as they rotate is illustrated in Figures 4, 5 and 6, in which the relationship of the rolls is portrayed as the rolls have rotated through successive arcs of 30°. In Figure 4 the rolls are shown as having been set initially 60° out of phase, so that while in one set of alternate rolls each roll has an angle at the top and a side at the bottom, each roll in the other set of alternate rolls has a side at the top and an angle at the bottom. The spacing between all the rolls will be uniform when they are in that position, assuming that the spacing between the axes of all the rolls is the same.

If the rolls are all rotated simultaneously at the same speed and in the same direction as indicated by the arrows, alternate spaces between the rolls will increase in width while the other alternate spaces will decrease in width to the maximum spacing shown at the left of Figure 5 and the minimum spacing at the right of Figure 5. As the rotation continues through another 30° to the relationship of the rolls shown in Figure 6, the spacing between the rolls again will become equalized, and as the rotation continues through still another 30°, the space at the right would become maximum, while the space at the left would become minimum.

With a roll arrangement and rotation such as shown in Figures 4, 5 and 6, therefore, the quantity of material being dispensed on the average would be uniform and the quantity being dispensed at any particular instant would be very close to such average value. The quantity of material thus dispensed may be regulated by changing the speed of rotation of the rolls in any given installation. The faster the rolls are turned, the greater will be the quantity of material delivered, and the slower the rotation the less will be the quantity. Assuming that a rather small uniform deposit of material is desired, that such material is not excessively coarse and that the rolls are spaced apart almost as far as they can be without the material falling between them when they are not rotating, the desired dispensing operation can be accomplished by turning the rolls very slowly, such as only a few revolutions per minute.

As one typical roll and drive installation shown in Figures 1 and 2, the rolls 1 and the rolls 2 may be supported in suitable end bearings including a bearing 10 and a bearing 20 at the outer ends of the respective rolls which are located outside the bin B. The inner ends of the roll shafts are supported by a common bearing 11, above which is located a baffle ridge 21 to deflect the material from the bearings 11 onto the set of rolls 1 or 2. The sets of rolls are driven independently by chains 12 and 22 which engage sprockets 13 and 23, respectively, on the outer ends of the roll shafts. Rails 14 and 24 overlying the sets of sprockets 13 and 23, respectively, insure driving contact of chains 12 and 22 with the sprockets 13 and 23.

Beneath the set of rolls 1 is a conveyor 15 and beneath the set of rolls 2 a conveyor 25 onto which the material falling between the rolls is dispensed. As these conveyors move lengthwise of the bin and transversely of the rolls, a progressively increasing amount of material will accumulate on the conveyors, which eventually will be deposited into a chute 3 as shown in Figure 2, for example. The conveyors 15 and 25 are driven independently by suitable drive sprockets 16 and 26 carried by shafts 17 and 27, which shafts in turn are independently rotated by drive sprockets 18 and 28.

The individual rolls of convex, equilateral triangular shape may be fabricated in various ways. Figures 7 and 8 illustrate two representative types. In Figure 7 collars 4 are mounted on and keyed to a shaft 40 and to the collars are secured, such as by welding, end plates 41. These end plates are of convex equilateral triangular shape conforming to the desired cross section of the rolls. Similar intermediate plates may be provided, if desired.

On the plates 41 are then assembled, again by welding if desired, three convex plates 42 arranged in substantially edge-cutting relationship so that their edges meet at the angles of the rolls. Their edges are joined at such angles by welds 43. Preferably each of the plates 42 is of cylindrically convex shape, and the radius may be approximately twenty percent greater than the maximum radius of the roll, or approximately forty percent greater than the minimum radius of the roll.

In Figure 8 the end plates 44 secured to the collars 4 are of circular shape and form the ends of cylindrical rolls 45 having an external radius equal to the minimum internal radius of the triangular roll. On the exterior of the cylindrical roll are mounted three similar nosings 46, each of ogival cross section, the edges of which abut and are engageable with the periphery of cylindrical roll 45. Such abutting edges are secured together and to the backing roll 45 by seam welds 47. The curvature of the nosing sides will be such that the adjacent sides of adjacent nosings will lie in the same arc. Preferably roll 45 will be of substantial wall thickness and constitute the main supporting structure of the roll, and the nosings 46, being of rigid shape in themselves and intimately supported by the roll 45, may be of relatively light plate or sheet metal material.

The dispensing function of the apparatus described above may be utilized for various special purposes, and Figure 9 shows a particular application of the dispensing apparatus to depositing of a mat in the manufacture of fiberboard. It is desired that such mat include surface layers of relatively fine particles and a central or core layer of relatively coarse particles. Preferably such particles, irrespective of their size, are of fibrous nature and will be described as such, although some or all of the material may be particles which are not appreciably elongated.

The mat will be deposited on a surface S moving in the direction indicated by the arrow in Figure 9, which may be a continuous belt or a series of caul plates arranged end-to-end. Along the path of travel of the mat receiving surface are arranged three material bins B1, B2 and B3. The bottom of each of these bins is formed of material dispensing rolls which may be of the type generally described above.

As illustrated in Figure 9, the final mat laid up will include a relatively thin layer of the fine material at each surface and a relatively thick layer of the coarse material in the center. Consequently, the dispensing rolls of bins B1 and B3 must be different from the rolls of bins B2 in order that the proper relative amounts of material may be dispensed since the surface S will travel at uniform speed beneath the three bins.

Various expedients may be utilized for thus regulating the relative amounts of material delivered, one being that the horizontal width of bin B2 in the direction of travel of the mat is greater than the horizontal width of bins B1 and B3, as shown in Figure 9. Other differences may be provided, and since the dispensing structure of bin B1 may be substantially the same as that of bin B3, a comparison of the roll dispensing mechanism of bins B1 and B2 will suffice.

Because the material to be dispensed from bin B1 is finer than that dispensed from bin B2, the rolls 5 of bin B1 will, as shown, be located closer together than the rolls 50 of bin B2, as shown. In addition, because the finer material will have less tendency to bridge within the bin, the rolls 5 may be somewhat smaller than the rolls 50. A relatively small amount of material dispensed from bin B1 as compared to the amount dispensed from bin B2 can be controlled, not only by the spacing of rolls 5 closer than rolls 50, but by turning the rolls 5 slower than rolls 50. Still a different expedient would be to select rolls of different shape, such as by the rolls in the bottom of bin B2 being of equilateral triangular shape having flat sides such as shown in Figure 22, or concave sides such as shown in Figure 23, to afford a larger opening between adjacent rolls of the same maximum radius while the rolls in the bottom of bin B1 would be of equilateral triangular shape having convex sides.

Alternatively, the spacing variation between the rolls in the bottom of bin B1 may be reduced by making them of equal quadrilateral shape, having convex sides, such as shown in Figure 25, for example.

In any of these various ways the roll dispensing mechanism of bins B1, B2 and B3 can be designed and operated to effect delivery of each type of material at the proper relative rate, and the total thickness of the mat deposited can be varied by regulating the speed of translation of the surface S beneath the three bins. It is possible that even when the various regulating expedients discussed above are employed, the layers deposited may not be of exactly the desired depth or have an exactly level upper surface. Any slight variation in or improper delivery may be corrected by utilizing leveling mechanism located adjacent to the mat discharge side of each bin.

Thus at the discharge side of bin 1 a header 51 may be mounted which is evacuated by a suction pipe 52. This header may carry a long, narrow suction nozzle 53, or a series of such nozzles arranged transversely of the direction of travel of the surface S and disposed close together. An air inlet pipe 54 may be connected to the vacuum header 51, which can be regulated to provide the proper degree of suction in the nozzle or nozzles 53. The material picked up from the upper surface of the lower layer in leveling it will be carried off through the suction pipe 52 and deposited again in bin B1.

A somewhat similar expedient for leveling the central layer of material may be provided at the mat discharge side of bin B2. Because this core material is coarser than the surface material, it may not be leveled as easily or as uniformly by use of a suction nozzle or nozzles alone. In this case a larger suction nozzle 55 is supported by a pivot 56 on the suction pipe 57, so that the nozzle may be swung up to enable a thicker mat to pass beneath it, or downward to level a thinner mat. Ordinarily whatever may be the thickness of the mat, the thickness of the surface layers of relatively fine material can be the same, so that it is only necessary to vary the thickness of the central layer of material as may be required for production of a fiberboard of the desired thickness. To assist the vacuum nozzle 55 in leveling the central layer of material a rotary rake 58 may be mounted between the vacuum nozzle and bin B2. This rake includes several rows of rods or wires spaced transversely of the direction of movement of the surface S which will comb the upper surface of the central layer and propel the excess material toward the vacuum nozzle. The shaft of the rotary rake may be mounted in slots 59 of supporting brackets which are inclined so that the shaft of the rake will be kept in approximately the same spaced relationship to the nozzle 55 as the nozzle and rake are adjusted for various mat thicknesses. The rake may be driven by any suitable mechanism.

At the discharge side of bin B3 a final leveling suction nozzle arrangement will be provided, including the suction pipe 52', the vacuum header 51', the vacuum nozzle or nozzles 53' and the air inlet pipe 54', which are comparable to the corresponding components of the vacuum nozzle arrangement at the discharge side of bin B1 described above. Suitable supporting mechanism, not shown, will carry this vacuum nozzle so that its height may be adjusted to correspond to the thickness of the mat central layer. The thickness of such central layer may be regulated without changing the speed of travel of the surface S beneath the bins in order to keep the depths of the surface layers constant merely by increasing the rotative speed of rolls 50 and adjusting the height of vacuum nozzle 55 and rake 58 correspondingly without any other adjustments. As described in connection with the operation of the first leveling mechanism, material picked up from the surface of the upper layer may be carried through vacuum pipe 52' and redeposited in bin B3. Similarly, the material picked up by vacuum nozzle 55 may be carried upward through suction pipe 57 and deposited in bin B2. By such mechanism, therefore, a mat of desired thickness and character may be laid up entirely from dry material, ready for a pressing operation.

Having considered general and specific applications of the roll dispensing mechanism, it will be understood that the requirements for such roll dispensing mechanism may vary widely, and, on the contrary, a variety of roll sizes, shapes, arrangements and speeds of rotation may be combined in different ways to satisfy the requirements of a particular application. Various possible roll arrangements, shapes and controls have therefore been shown in the drawings as examples, which are described hereafter.

While in Figures 4, 5 and 6 the equilateral triangular rolls having convex sides are shown all rotating in the same direction with their axes spaced equally and with the relationship of adjacent rolls 60° out of phase. In the structure shown in Figures 10, 11 and 12 rollers of the same shape, having their axes equally spaced, are illustrated, but in these instances the rollers are all in phase, at least at certain times during their rotation. Thus as shown in Figure 11, all the rolls 6 are arranged with angles uppermost and convex sides facing downward, and as the rolls turn through 30° to the positions shown in Figure 12, all the rolls will have angles directed to the left. With this roll arrangement in which the rolls are all driven in the same direction, all the spaces between the rolls vary in width simultaneously and to the same extent instead of, as in Figure 5, the space between one pair of adjacent rolls being greater than the next space at each side of such pair. For a given center spacing of the rolls in Figures 11 and 12 no space would ever be as wide or as narrow as would be the spaces if, with the same center line spacing, the rolls were oriented relative to each other as shown in Figures 4, 5 and 6.

On the other hand, the same alternate wide and narrow spacing between the rolls and the same degree of variation in the width of spacing between the rolls as possible with the orientation of Figures 4, 5 and 6 are also possible with the roll orientation of Figures 11 and 12 if, instead of the rolls all being rotated in the same direction, alternate rolls are rotated oppositely as shown in Figure 10. In this figure, as in Figure 5, one set of alternate spaces between rolls 60 is maximum and the other set of alternate spaces is minimum.

While, when the rolls all rotate in the same direction, the variation in space width is minimum with the rolls relatively oriented as in Figures 11 and 12 and maximum with the rolls oriented as in Figures 4, 5 and 6, it will be evident that an intermediate orientation would be possible where the alternate rolls are out of phase by 30°, for example, instead of 60°, in which case every third roll would be similarly oriented. With such an arrangement the variation in spacing would be greater than with that of Figures 11 and 12 and less than for that of Figures 4, 5 and 6.

Where adjacent rolls rotate in opposite directions, as do the rolls 60 in Figure 10, it will be evident that while the spacing between each pair of rolls varies in the same manner as the spacing between any other pair of rolls, assuming that the spacing between all the roll axes is the same, it is probable that the amount of material falling between the rolls at the left of Figure 10 would not be the same as the amount of material falling between the rolls at the right of Figure 10. At the left of Figure 10 the peripheries of the rolls 60 move downward conjointly, whereas at the right of Figure 10 the peripheries of the rolls move upward conjointly, so that the tendency in the former case is to increase the discharge of material and the tendency in the latter case is to reduce the discharge of material. If equal material delivery through all spaces is desired, therefore, the upwardly moving sides of adjacent rolls should be placed closer together than the downwardly moving sides of adjacent rolls by appropriate unequal roll axle spacing, or the rolls should all turn in the same direction.

On the other hand, it may be preferred to encourage movement of material only through alternate spaces and to discourage, or, indeed, prevent entirely delivery of material through the other alternate spaces. One such arrangement is shown in Figures 13, 14 and 15.

In Figure 13 all the rolls 61 are shown as being oriented the same, that is, with one angle directed upward and with a convex side facing downward during one phase of their rotation. The spacing between the axles of these rolls varies, however, so that a narrow roll spacing alternates with a wider roll spacing. Adjacent rolls turn in opposite directions such that the upwardly moving sides of adjacent rolls are closer together than the downwardly moving sides of adjacent rolls on the average.

The phases of roll rotation in which the spaces between the rolls are maximum and minimum are illustrated in Figures 14 and 15. It will be noted that when the more closely spaced rolls are disposed with apexes adjacent to each other, there is virtually no spacing between these rolls, whereas the arcuate sides of the more widely spaced rolls are disposed adjacent at that time to provide an opening of maximum width, as shown in Figure 14. When the rolls have turned through an angle of 60° the space is maximum between the more closely spaced rolls, as shown in Figure 15, but may still be less than the spaces between the more widely spaced rolls where the apexes are adjacent. Also such apexes are moving downward, whereas the arcuate roll sides are moving upward, which type of movement increases flow of material between the more widely spaced rolls and discourages movement of material between the more closely spaced rolls.

While a roll arrangement and rotation as discussed in connection with Figures 14 and 15 affords virtually a complete barrier to the material between the more closely spaced rolls, such control over the material can be rendered absolutely positive by providing baffle members such as shown in Figure 16, either with or without control gates. In this apparatus it is assumed that the rolls are arranged as discussed in connection with Figure 13, and are of the same type. The baffles 62 in the form of inverted V-shaped barriers are disposed to form ridges bridging between the rolls of each pair of more closely spaced rolls so as to serve the dual purpose of preventing movement of material between such more closely spaced rolls and diverting the material above such space into adjacent spaces between more widely spaced rolls.

To control the flow between such more widely spaced rolls without varying their speed of rotation gates 63, supported from the baffles 62, may be provided. These gates may move between subtantially horizontal positions in which swinging edges of adjacent gates are disposed close together to block completely the flow of material, and a downwardly swung attitude in which the space between the swinging edges of the gates may be increased or decreased in accordance with the degree of swing downward to afford any desired width of dispensing opening over a reasonably wide range. While such gates might be of the sliding type, mounted on opposite sides of baffle 62, to move edgewise downward in planes parallel to such baffle sides, it is preferred that the gates be hinged as shown in Figure 16 and that swinging of such gates to vary the degree of opening be controlled by mechanism interconnecting cooperating gates such as meshing gear quadrants 64 rotatable about the respective pivot axes of the cooperating gates. Rotation of such gear quadrants provided for all the gates of the mechanism may be affected by mounting on one quadrant of each pair an arm 65 to swing the gear quadrant on which it is mounted and interconnecting all the arms by a bar 66 which is movable lengthwise to any desired adjusted position by swinging of an adjusting lever 66' carried by pivot 67 and located outside the dispensing mechanism.

While the control mechanism shown in Figure 16 will afford entirely positive control of the flow of material through the dispensing rolls, nearly as positive a control can be obtained from less complex mechanism, such as shown in Figures 17 to 21, inclusive. In all these figures the control mechanism is shown associated with rolls whose axes are equally spaced, rotate all in the same direction and are of the convex, equilateral triangular type, as shown in Figures 11 and 12.

In Figure 17 the control bars 7 are flat and are mounted on trunnions 70, disposed substantially midway between the rotative axes of the rolls in each instance. These bars may turn about such trunnions from a substantially horizontal position in which the spaces between the adjacent rolls are obstructed to the greatest extent, and a more or less inclined position in which the plates slope downwardly toward the upwardly moving sides of the rolls beneath them. Such movement opens to a greater or lesser extent a passage indicated by the broken-line arrow. The width of each such bar, the distance of the trunnions above the peripheries of the rolls, and the degree of swing of the rolls utilized for controlling flow of the material will depend upon the type of material being dispensed. Coarse material which tends to bridge easily may be controlled by relatively narrow bars spaced relatively far above the peripheries of the rolls.

In Figure 18 a type of control bar better able to control the flow of finer types of material is shown. This control bar 71 is of generally sector shape in cross section, and is swingably mounted on a shaft 72. Such shaft is disposed generally in the same location as the trunnions 70 of the apparatus shown in Figure 17, namely located approximately midway between the rotative axes of the rolls 6 and spaced above the peripheries of such rolls. In this instance, however, the quadrant shaped bars depend from the shafts and are swingable between the solid-line position shown in Figure 18, in which the space between the periphery of the bar and the downwardly moving roll side is small, and the broken-line position in which the bars are swung toward the upwardly moving roll sides to open a passage of substantial width for material to flow along the paths indicated by the broken arrows and between rolls 6.

In Figure 19 the control bars 73 are of triangular cross section, and, like the bars 71, are carried by turnable shafts 74. These shafts similarly are disposed approximately midway between the axes of adjacent rolls 6 and located above their peripheries. In the solid-line positions shown the upwardly convergent sides of the bars tend to deflect the material toward the roll centers to encourage bridging and reduce the amount of material disposed between the rolls. As shafts 74 are turned to rotate the control bars toward the broken-line positions, however, the side adjacent to the downwardly moving roll side moves first toward vertical position to decrease the bridging action, and finally into a position inclined toward the upwardly moving roll side so as to provide a passageway as indicated by the broken-line arrows, through which material may be fed readily into the spaces between the rolls. As discussed in connection with the control bars of Figure 17, the size of the triangular control bars 73 and their spacing above the peripheries of the rolls may be varied depending upon the coarseness or fineness of the material being dispensed. The finer the material, of course, the larger the control bars should be and the closer they should be disposed to the peripheries of rolls 6.

In Figures 20 and 21 adjusting mechanism for the type of control bars discussed in connection with Figure 19 is shown, but precisely the same type of adjusting mechanism can be utilized for moving the bars shown in Figures 17 and 18. As illustrated in Figure 21, the roll arrangement and drive is exactly the same as shown in and discussed in connection with the apparatus of Figure 1. To such apparatus is added the passageway control bars 73 described. The adjusting mechanism for such bars includes an arm 75 carried by each shaft 74, and the swinging ends of all these arms are interconnected by a lengthwise reciprocable bar 76, which may be reciprocated by swinging lever 77 to which bar 76 is pivoted. Such lever is carried by pivot 78 mounted on a bracket 79, located exteriorly of the material bin B and the position of lever 77 may be set in any one of several notches 79' provided in bracket 79 corresponding to different adjusted rotative positions of the control bars. It will be evident that any number of such notches 79' or equivalent holding means may be provided, depending upon the nicety of control bar setting desired.

While the foregoing discussion has centered around mechanism incorporating rolls of the convex, equilateral triangular type as the preferred example, it has been mentioned that rolls of other shapes, either triangular, bilateral or quadrilateral and having planar, concave or convex sides might be used, and for dispensing some materials may be preferable. Such representative rolls are shown in Figures 22 to 27, inclusive.

As diversifications of the convex equilateral triangular rolls described above, rolls 8 of triangular shape having planar sides but still of the equilateral type are shown in Figure 22. In Figure 23 concave equilateral triangular rolls 80 are shown. Assuming that the planar equilateral triangular rolls of Figure 22 and the concave equilateral triangular rolls of Figure 23 initially were oriented in the same phase relationship, as are the convex equilateral triangular rolls of Figures 11 and 12, and were rotated all in the same direction as indicated in Figure 23, the principal difference would be that the variation between minimum and maximum spacing would be greater with the planar equilateral triangular rolls of Figure 22 than with the convex equilateral triangular rolls of Figures 11 and 12 and would be still greater where concave equilateral triangular rolls as shown in Figure 23 are used. Alternatively, either the planar equilateral triangular rolls, as shown in Figure 22, or the concave equilateral triangular rolls 80 of Figure 23, could be rotated so that adjacent rolls turned in opposite directions which is illustrated in Figure 22 and is like the operation described in conjunction with Figure 10. Again the principal difference is in the amount of variation in spacing between the adjacent rolls as they revolve, such variation being greatest with the concave equilateral triangular rolls 80 and intermediate between the convex equilateral triangular rolls and the concave equilateral triangular rolls with the planar equilateral triangular rolls of Figure 22.

Bilateral convex rolls 81 of lenticular cross section, as shown in Figure 24, may, if desired, be utilized instead of triangular rolls. The effect of bilateral rolls is to increase the variation between minimum and maximum spacing over the variation in such spacing which occurs with convex equilateral triangular rolls. While these rolls are illustrated as all rotating in the same direction and as being similarly oriented, it will be evident that they could rotate so that adjacent rolls turned in opposite directions if desired.

In Figure 25 convex equilateral quadrilateral rolls 82 are shown, while the quadrilateral rolls 83 of Figure 26 have planar sides, and the equilateral quadrilateral rolls 84 of Figure 27 have concave sides. The variation between minimum and maximum opening for a quadrilateral type of roll is less than such variation for a triangular type of roll having corresponding types of sides, initial orientation and direction of rotation. In all the illustrations of Figures 25, 26 and 27 the rolls are shown as turning in the same direction and are shown as having initially similar positions of orientation. It will be understood, however, that with such rolls adjacent rolls could turn oppositely if desired, as discussed in connection with the other forms.

Also, without illustrating in the drawings all the various possible arrangements, it will be appreciated that as discussed in connection with the installations of convex equilateral triangular rolls it is not necessary that the spacing of the rotative axes be uniform, or that the initial orientation of all the rolls be the same. By selection of different shapes of roll cross section, by varying the amount of rotative axis spacing, by varying the uniformity of such spacing, by changing the sizes of the rolls, by changing the speed of rotation of the rolls, by changing the initial relative orientation of the rolls, by changing the directions of rotation so that all rotate in the same direction or adjacent rolls turn oppositely, and by providing suitable control gates, control bars and baffles to regulate the opening between the rolls, it will be evident that almost any desired type of control over the dispensing of a wide variety of materials is possible.

I claim as my invention:

1. Dispensing mechanism for material particles comprising a container, a plurality of parallel, closely-spaced, plural-sided rolls in the bottom of said container, means supporting said rolls in positions with their closest adjacent portions always spaced apart an appreciable distance, power means operable to rotate said rolls, and means interconnecting said rolls and operable to coordinate rotation thereof for reducing the distance between the closest portions of adjacent rolls during their rotation from a maximum spacing less than the greatest radius of a roll for working the material downward between said rolls.

2. Dispensing mechanism for material particles comprising a container, a series of parallel, closely-spaced, plural-sided rolls having adjacent sides meeting in apexes and forming in the bottom of said container a series of openings between adjacent rolls, means supporting said rolls in positions with their closest adjacent portions always spaced apart an appreciable distance, power means operable to rotate said rolls, and means interconnecting said rolls and operable to coordinate rotation thereof for varying the distance between an apex of one roll and the adjacent side of an adjacent roll during their rotation for working the material downward between said rolls.

3. The dispensing mechanism defined in claim 2, in which the rolls are of equilateral triangular cross section.

4. The dispensing mechanism defined in claim 2, in which the rolls are of convex equilateral triangular cross section.

5. The dispensing mechanism defined in claim 2, in which the rolls are of convex equilateral bilateral cross section.

6. The dispensing mechanism defined in claim 5, in which the rolls are of lenticular cross section.

7. The dispensing mechanism defined in claim 2, in which the rolls are of equilateral quadrilateral cross section.

8. Dispensing mechanism for material particles comprising a bin containing such material particles, a series of parallel, closely-spaced, plural-sided rolls forming a major portion of the area of the bin bottom supporting such material particles in said bin and including a series of openings between adjacent rolls, means operable to rotate said rolls, and means interconnecting said rolls and operable to coordinate rotation thereof for varying the distance between the closest portions of adjacent rolls during their rotation for working the material downward between said rolls.

9. The dispensing mechanism defined in claim 8, in which the rolls are arranged in two elongated sets, the roll axes in each set extending transversely of the length of such set and the sets being disposed side by side in a direction transversely of the lengths of said sets, and independent means operable to rotate the rolls of each set.

10. Dispensing mechanism for material particles comprising a container, a series of parallel, closely-spaced, plural-sided rolls forming in the bottom of said container a series of openings between adjacent rolls, power means, and means connecting said power means to said rolls to rotate alternate rolls of said series in corresponding directions and the other alternate rolls in opposite corresponding directions for working more material downward between adjacent roll sides moving downward than between adjacent roll sides moving upward.

11. The dispensing mechanism defined in claim 10, and means supporting said rolls with their axes adjacent to downwardly moving roll sides disposed farther apart than their axes adjacent to upwardly moving roll sides.

12. Dispensing mechanism for material particles comprising a bin containing such material particles, a series of parallel, closely-spaced, plural-sided rolls forming a portion of the bottom of said bin supporting the material particles in such bin, means supporting said rolls in positions with their closest adjacent portions always spaced apart an appreciable distance to define slots therebetween, power means operable to rotate said rolls for working the material downward through such slots between said rolls, and control members disposed in said bin above and in registry with such slots, respectively, closely adjacent to the upper surfaces of said rolls and each member being operable to restrict the slot with which it is in registry to deter passage of material through such slots.

13. The dispensing mechanism defined in claim 12 in which each control member is disposed above the upper surfaces of adjacent rolls and generally midway between the axes thereof, and means pivotally supporting each control member for turning about an axis parallel to the rotative axes of such adjacent rolls for varying the degree of slot restriction.

14. The dispensing mechanism defined in claim 13 in which the control member is a control bar.

15. The dispensing mechanism defined in claim 14 in which the control bar is of flat cross section.

16. The dispensing mechanism defined in claim 14 in which the control bar is of triangular cross section.

17. The dispensing mechanism defined in claim 14 in which the control bar is of substantially sector cross section, depending below its rotative axis.

18. Dispensing mechanism for material particles comprising a container, a plurality of parallel, closely-spaced, plural-sided rolls in the bottom of said container between which material from said container may pass downward, power means operable to rotate said rolls continuously all in the same direction, and means interconnecting said rolls and operable to coordinate rotation thereof for varying the distance between the closest portions of adjacent rolls during their rotation for working the material downward between said rolls.

19. The dispensing mechanism defined in claim 18, in which the rolls all rotate in the same phase relationship.

20. The dispensing mechanism defined in claim 18, in which the rolls are three-sided, and alternate rolls are sixty degrees out of phase rotatively relative to the other alternate rolls.

21. Dispensing mechanism comprising a material receiving conveyor, a plurality of containers disposed along the length of said material receiving conveyor, and a plurality of parallel, closely-spaced, plural-sided rolls in the bottom of each of said containers between which material from said container may pass downward, power means operable to rotate said rolls, and means interconnecting said rolls and operable to coordinate rotation thereof for varying the distance between the closest portions of adjacent rolls during their rotation for working the material downward between said rolls to place a layer of material from one of said containers directly on said conveyor, and a second layer of material from another of said containers on said first layer.

References Cited in the file of this patent

UNITED STATES PATENTS

| Number | Name | Date |
|---|---|---|
| 463,493 | Dellone | Nov. 17, 1891 |
| 526,254 | McAnulty | Sept. 18, 1894 |
| 530,261 | Distl et al. | Dec. 4, 1894 |
| 964,512 | Handle | July 19, 1910 |
| 1,032,132 | Gormley | July 9, 1912 |
| 2,412,121 | Bradshaw | Dec. 3, 1946 |
| 2,589,589 | Woodruff | Mar. 18, 1952 |